(12) United States Patent
Yamamoto

(10) Patent No.: US 8,780,200 B2
(45) Date of Patent: Jul. 15, 2014

(54) IMAGING APPARATUS AND IMAGE CAPTURING METHOD WHICH COMBINE A FIRST IMAGE WITH A SECOND IMAGE HAVING A WIDER VIEW

(75) Inventor: Katsuya Yamamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 367 days.

(21) Appl. No.: 13/204,990

(22) Filed: Aug. 8, 2011

(65) Prior Publication Data

US 2012/0050587 A1    Mar. 1, 2012

(30) Foreign Application Priority Data

Aug. 24, 2010    (JP) ................. 2010-187675

(51) Int. Cl.
H04N 7/18    (2006.01)
H04N 5/228    (2006.01)
H04N 5/222    (2006.01)

(52) U.S. Cl.
USPC .................. 348/143; 348/222.1; 348/333.01

(58) Field of Classification Search
CPC ... H04N 5/232; H04N 5/335; H04N 5/23293; H04N 7/181; H04N 7/183
USPC ......... 348/143, 144, 148, 149, 150, 152, 169, 348/333.01, 333.05, 333.11, 222.1
See application file for complete search history.

(56) References Cited

U.S. PATENT DOCUMENTS

| | | | | |
|---|---|---|---|---|
| 7,719,568 B2 * | 5/2010 | Hung et al. | ................ | 348/159 |
| 7,990,422 B2 * | 8/2011 | Ahiska et al. | ............ | 348/218.1 |
| 8,125,512 B2 * | 2/2012 | Fahn et al. | .................. | 348/36 |
| 8,390,686 B2 * | 3/2013 | Tanaka | ...................... | 348/159 |
| 8,405,732 B2 * | 3/2013 | Ahiska et al. | ............ | 348/211.3 |
| 2003/0025791 A1 * | 2/2003 | Kaylor et al. | ............... | 348/143 |
| 2004/0008773 A1 * | 1/2004 | Itokawa | ................. | 375/240.08 |
| 2008/0030592 A1 * | 2/2008 | Border et al. | ............. | 348/218.1 |
| 2008/0297601 A1 * | 12/2008 | Okada et al. | ................ | 348/159 |
| 2009/0128618 A1 * | 5/2009 | Fahn et al. | .................. | 348/39 |
| 2010/0265331 A1 * | 10/2010 | Tanaka | ...................... | 348/159 |

FOREIGN PATENT DOCUMENTS

| | | |
|---|---|---|
| JP | 2008-009263 | 1/2008 |
| JP | 2008-096584 | 4/2008 |
| JP | 2008-134452 | 6/2008 |
| JP | 2009-60404 | 3/2009 |
| JP | 2010-028158 | 2/2010 |
| JP | 2010-041299 | 2/2010 |

OTHER PUBLICATIONS

Office Action issued Mar. 25, 2014, in Japanese Patent Application No. 2010-187675, filed Aug. 24, 2010.

* cited by examiner

*Primary Examiner* — Nicholas Giles
(74) *Attorney, Agent, or Firm* — Oblon, Spivak, McClelland, Maier & Neustadt, L.L.P.

(57) ABSTRACT

An imaging apparatus, including: a first image capturing unit which obtains an image of a subject and outputs first image data; a second image capturing unit which obtains another image of the subject and outputs second image data, wherein the second image capturing unit has a wider view than a view of the first image capturing unit; and a display which displays the first and second image data, wherein the first image capturing unit automatically captures an image after the subject moved from being only within the view of the second image capturing unit to be within the view of the first image capturing unit.

15 Claims, 12 Drawing Sheets

(a)

(b)

(c)

(a)

(b)

(a)

(b)

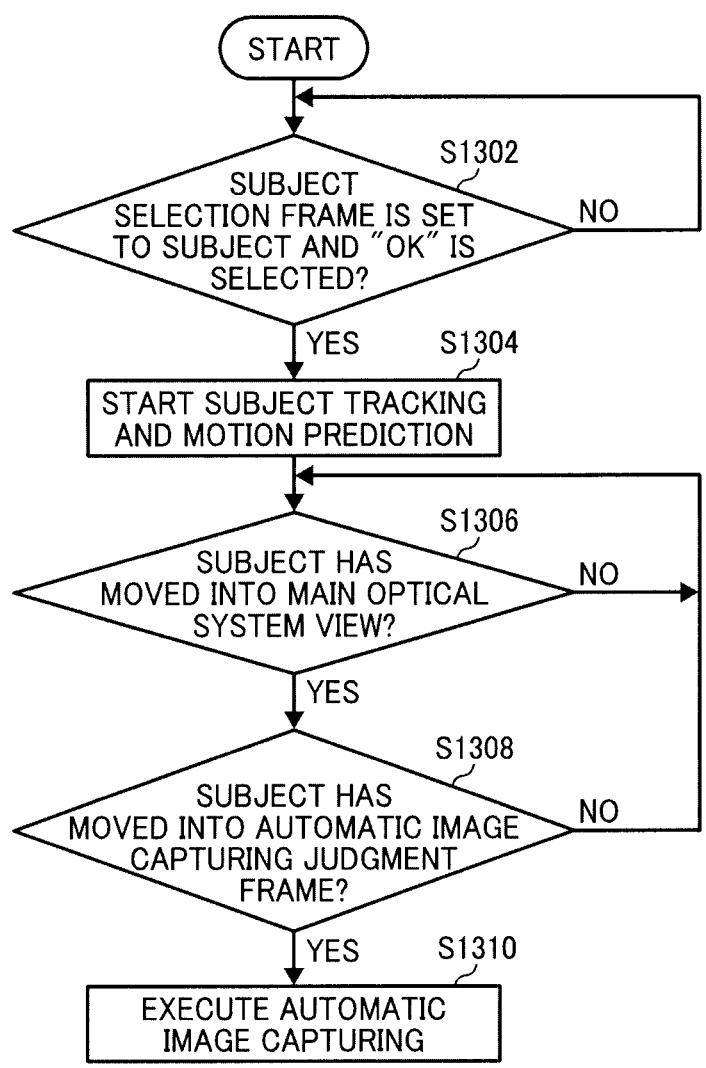

IMAGING APPARATUS AND IMAGE CAPTURING METHOD WHICH COMBINE A FIRST IMAGE WITH A SECOND IMAGE HAVING A WIDER VIEW

CROSS REFERENCE TO RELATED APPLICATIONS

This application claims the benefit of priority under 35 USC §119 from Japanese Patent Application No. 2010-187675, filed Aug. 24, 2010, the entire contents of which are incorporated herein by reference.

BACKGROUND

1. Technological Field

The exemplary embodiments described herein relate to an imaging apparatus and an image capturing method.

2. Description of the Related Art

There are digital cameras that include a long focus lens or a zoom lens. When capturing an image with the digital camera that includes a long focus lens or a zoom lens, a photographer sees an image to be captured through a finder or a display. In general, a view of the image through a finder or a display nearly corresponds to the image captured by the long focus lens or the zoom lens.

When a subject is moving and a user moves the digital camera to track the subject, it may be difficult for the photographer to keep the subject within the view provided by the finder or the display.

Even if a subject is not moving, it may be difficult for a photographer to capture an image of an intended subject. Also, it may be difficult for a photographer to quickly change a direction of the digital camera to capture an image of another subject after capturing an image of a first subject.

As a general image capturing technique, there is a method in which the photographer opens both eyes, and directly views the subject with his left eye, and views an image to be captured in a finder with his right eye. However, this method requires a high level of skill. Also, a shape of a finder determines how easy it is to use this method. It is highly difficult for a photographer to use this technique with a digital camera that does not have a finder aligned with one of his or her eyes.

Also, when a subject is moving, there is a method that is used to capture an image of the moving subject when subject moves into a view the camera is positioned to taken an image of. In this capturing method, the photographer must have a high level of skill because he must see view a whole area in which the subject is moving in, must track a moving speed and location of the subject, and must capture an image at an appropriate time.

SUMMARY

According to an exemplary embodiment, there is provided an imaging apparatus and image capturing method which can track a subject and capture an image.

An imaging apparatus, including: a first image capturing unit which obtains an image of a subject and outputs first image data; a second image capturing unit which obtains another image of the subject and outputs second image data, wherein the second image capturing unit has a wider view than a view of the first image capturing unit; and a display which displays the first and second image data, wherein the first image capturing unit automatically captures an image after the subject moved from being only within the view of the second image capturing unit to be within the view of the first image capturing unit.

A method including: causing a first image capturing unit to obtain an image of a subject and output first image data; causing a second image capturing unit to obtain another image of the subject and output second image data, wherein the second image capturing unit has a wider view than a view of the first image capturing unit; and automatically capturing, with the first image capturing unit, an image after the subject moved from being only within the view of the second image capturing unit to be within the view of the first image capturing unit.

BRIEF DESCRIPTION OF THE DRAWINGS

FIG. 13 is a flowchart illustrating an operation of an imaging apparatus.

DETAILED DESCRIPTION

Hereinafter, exemplary embodiments of an imaging apparatus and an image capturing method will be described with reference to the drawings.

Figure 1A:
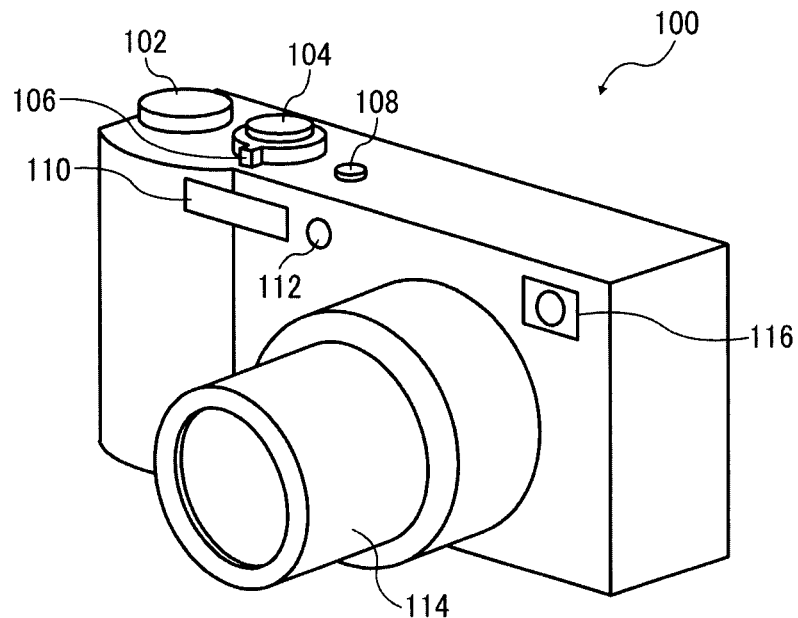
FIG. 1A and FIG. 1B illustrate schematic diagrams showing the appearance of an imaging apparatus.
Figure 1B:
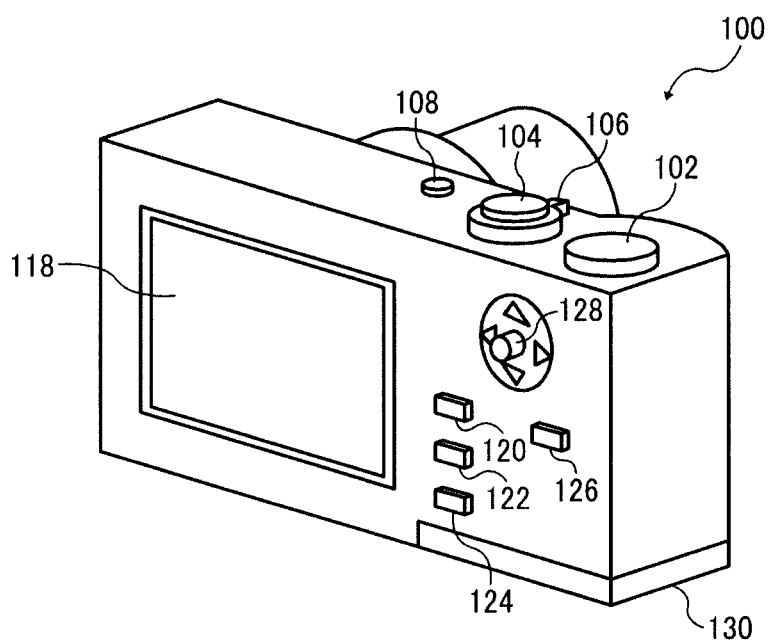

FIG. 1A and FIG. 1B illustrate schematic diagrams showing the appearance of an imaging apparatus 100.

The imaging apparatus 100 displays an image to be captured or obtained by a main optical system and an image formed by combining image data to be captured or obtained by a main optical system and image data obtained by a peripheral optical system. The main optical system is an optical system for photography, and the peripheral optical system is an optical system which has a wider view than the main optical system.

The imaging apparatus 100 can easily switch an image shown on a display system between an image to be captured or obtained by a main optical system and an image formed by combining image data to be captured or obtained by a main optical system and image data obtained by a peripheral optical system. By switching the image displayed on the display system, the user can capture an image of a moving subject by having the display system display the image formed by combining image data to be captured by a main optical system and image data obtained by a peripheral optical system. With the peripheral optical system providing a wider view, the photographer is able to watch, on the display system, the subject move into an area that the main optical system will capture an image of.

The image displayed on display system may be switched manually or automatically. With manual switching, the image displayed on the display system is switched in response to user operation of a button (physical or on a GUI), switch, or toggle of the imaging apparatus 100. With automatic switching, for example, the imaging apparatus 100 tracks an assigned subject, and when it is detected that the assigned subject moves out of a view that would be captured by the main optical system, the display system is switched to display a view including a peripheral view obtained by the peripheral optical system. Furthermore, when the assigned subject moves into a view that would be captured by the main optical system, the display system is automatically switched to display a view that would be captured by the main optical system.

For both manual and automatic switching, a screen display may change suddenly or may change gradually by expanding or shrinking a display area.

Furthermore, after tracking a moving subject, the imaging apparatus 100 can be configured to automatically capture an image when the moving subject is at a particular location. The imaging apparatus 100 can predict a motion of the moving subject based on the information regarding the motion of the subject obtained by the main optical system and the peripheral optical system. The imaging apparatus 100 can specify that when the moving subject arrives at a set location within an area that will be captured by the main optical system, the imaging apparatus 100 will automatically capture the image. With this feature, a user can easily capture a high quality image of a moving subject because the imaging apparatus 100 predicts a timing at which the moving subject arrives at the set location, and automatically captures the image.

FIG. 1A shows a front view of the imaging apparatus 100. The top face of the imaging apparatus 100 includes a mode dial 102, a release switch 104, a zoom lever switch 106, and a power switch 108.

The mode dial 102 is an operation unit in which a user is able to select one of "P" (program), "A" (aperture priority), "S" (shutter speed priority), "M" (manual) or another specific capturing mode.

The release switch 104 can be pushed in two stages. The push of switch 104 to the first stage can be an auto focusing operation, and the push of switch 104 to the second stage can capture an image. In general, the push of switch 104 to the first stage is called a half push, the push of switch 104 to the second stage is called a full push.

The front face of the imaging apparatus 100 includes a strobe light emitter 110, an AF (auto focus) auxiliary light emitter 112, a main optical system 114 and a peripheral optical system 116.

The main optical system 114 has a zoom lens, and changes an angle of view by use of the zoom lever switch 106. In addition, the main optical system 114 may have a long focus lens.

The peripheral optical system 116 may have a deep focus lens with a single fixed focus. Also, the peripheral optical system 116 may have a fixed angle of view that is the same as the widest angle of view of the main optical system 114. A user can quickly see a peripheral view by using the peripheral optical system 116 without driving or moving a lens for focusing because the peripheral optical system 116 has a deep focus lens with a single fixed focus.

FIG. 1B shows a back view of the imaging apparatus 100. The back face of the imaging apparatus 100 includes a LCD (Liquid Crystal Display) 118, a menu switch 120, a self-timer/delete switch 122, a display switch 124, a playing switch 126, and an up/down/left/right/OK switch 128.

The LCD 118, during preparation for capturing an image, displays an image to be captured by the main optical system 114 or an image obtained the peripheral optical system 116, by itself or combined with the image to be captured by the main optical system 114. Also, the LCD 118 displays various information available for capturing an image. The various information includes, but is not limited to, a mode aperture and a shutter speed of the imaging apparatus 100. The LCD 118 also displays the captured image.

The up/down/left/right/OK switch 128 can do five operations which include up, down, left, right, and push a lever or button to signify OK.

The bottom face of the imaging apparatus 100 includes a SD card/battery cap 130. The SD card/battery cap 130 can partially be seen from the back face and the lateral face.

Figure 2:
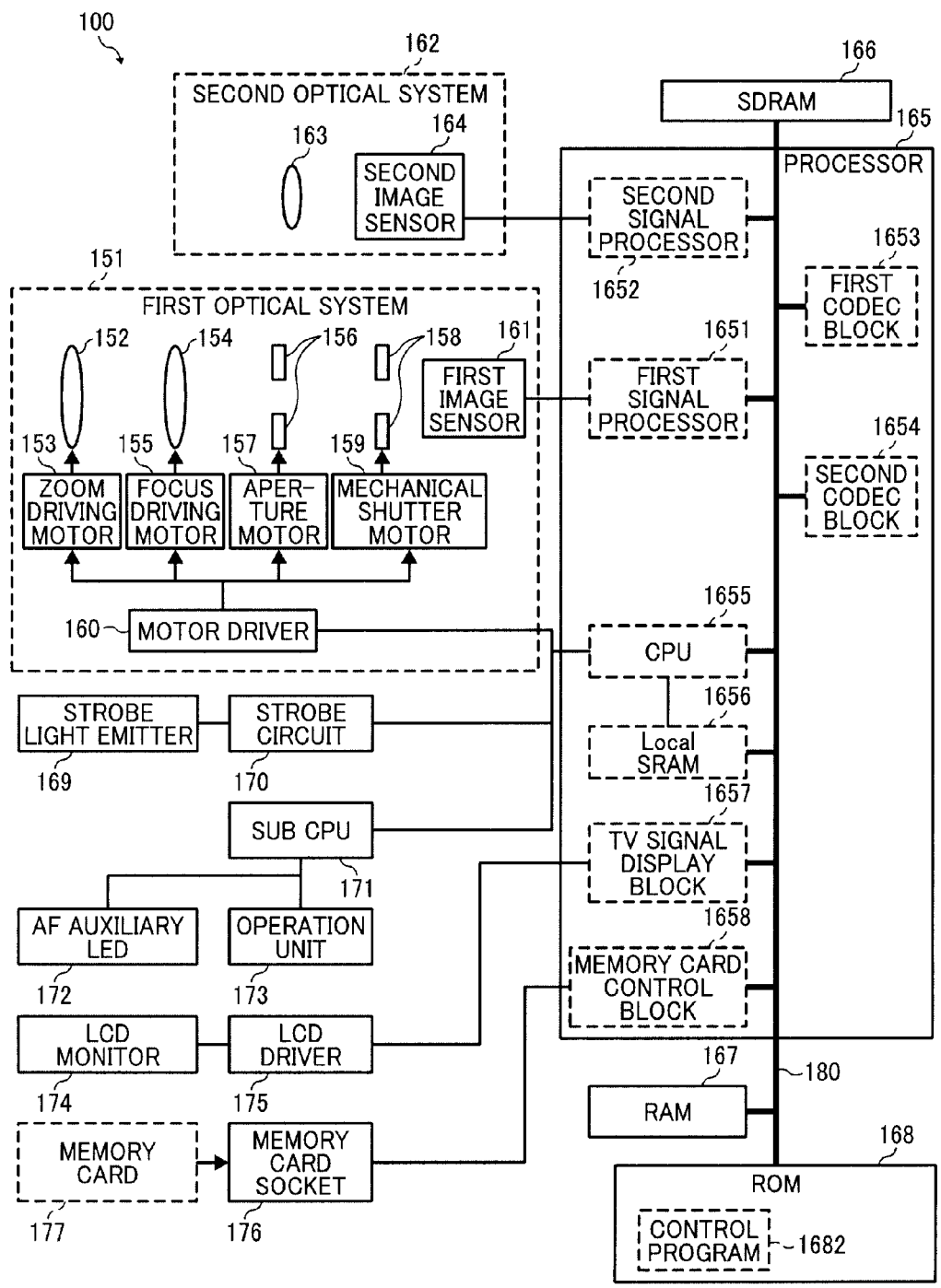
FIG. 2 illustrates a block diagram showing the hardware configuration of an imaging apparatus.

FIG. 2 illustrates a block diagram showing the hardware configuration of the imaging apparatus 100.

The imaging apparatus 100 includes a first optical system (main optical system) 151.

The first optical system 151 has a zoom optical system, a focus optical system, an aperture unit, a mechanical shutter unit, a motor driver 160, and a first image sensor 161.

The zoom optical system has a zoom lens 152 which takes in or obtains an optical image of a optical system has a focus lens 154 and a focus driving motor 155.

The aperture unit has an aperture 156 and an aperture motor 157. The mechanical shutter unit has a mechanical shutter 158 and a mechanical shutter motor 159.

The motor driver 160 connects to the zoom driving motor 153, the focus driving motor 155, the aperture motor 157, and the mechanical shutter motor 159. The motor driver 160 drives these motors.

The imaging apparatus 100 includes a second optical system (peripheral optical system) 162.

The second optical system 162 has a deep focus lens 163 with a single fixed focus and a second image sensor 164. The number of pixels of the second image sensor 164 is desirable to be less than the number of pixels of the first image sensor 161. In other words, the number of pixels of the first image sensor 161 is more than the number of pixels of the second image sensor 164. However, the number of pixels may be the same or the second image sensor 164 may have more pixels than the first image sensor 161.

The imaging apparatus 100 has a processor 165. The processor 165 connects to the first image sensor 161, the second image sensor 164, and the motor driver 160. The processor 165 processes white balance settings or gamma settings to modify data outputted by the first image sensor 161 and the second image sensor 164.

The processor 165 has a first signal processor 1651. The first signal processor 1651 connects to the first image sensor 161, and processes output signal outputted by the first image sensor 161.

The processor 165 has a second signal processor 1652. The second signal processor 1652 connects to the second image sensor 164, and processes an output signal outputted by the second image sensor 164.

The processor 165 has a first codec block 1653. The first codec block 1653 compresses, for example, a stop motion image data. For example, the first codec block 1653 may compress the stop motion image data in JPEG format.

The processor 165 has a second codec block 1654. The second codec block 1654 makes a mini image. For example, the second codec block 1654 may resize an image.

The processor 165 has a CPU 1655. The CPU 1655 connects to the motor driver 160, and controls each part of the imaging apparatus 100.

The processor 165 has a Local SRAM 1656. The Local SRAM 1656 connects to the CPU 1655. The Local SRAM 1656 temporally stores necessary data during controlling each part of the imaging apparatus 100.

The processor 165 has a TV signal display block 1657. The TV signal display block 1657 converts image data to video signal format, which may displayed a LCD monitor 174 or an external display device (monitor or television) that is communicatively coupled to the imaging apparatus 100.

The processor 165 has a memory card control block 1658.

The imaging apparatus 100 has a LCD monitor 174. The LCD monitor 174 is used for monitoring a state of a subject before capturing an image. Also, LCD monitor 174 is used for confirming a captured image, and used for displaying an image data stored in a memory card.

The imaging apparatus 100 has a LCD driver 175. The LCD driver 175 connects to the LCD monitor 174 and the TV signal display block 1657. The LCD driver 175 is a drive circuit which drives the LCD monitor 174. The LCD driver 175 converts video signal outputted by the TV signal display block 1657 to signal for displaying on the LCD monitor 174.

The imaging apparatus 100 has a strobe light emitter 169 and a strobe light circuit 170. The strobe light circuit 170 connects to the strobe light emitter 169, and connects to the CPU 1655.

The imaging apparatus 100 has an AF auxiliary LED 172, an operation unit 173, and a SUB CPU 171. The AF auxiliary LED 172 and the operation unit 173 connect to the SUB CPU 171. The SUB CPU 171 connects to the CPU 1655.

The imaging apparatus 100 has a memory card socket 176, a memory card control block 1658, and a memory card 177. The memory card socket 176 connects to the memory card control block 1658. The memory card 177 is set in the memory card socket 176.

The imaging apparatus 100 has a SDRAM 166, a RAM 167, and a ROM 168. The ROM 168 has a control program 1682.

The SDRAM 166, the first signal processor 1651, the second signal processor 1652, the first codec block 1653, the second codec block 1654, the CPU 1655, the Local SRAM 1656, the TV signal display block 1657, the memory card control block 1658, the RAM 167, the ROM 168 are mutually connected by a bus 180.

Figure 3:
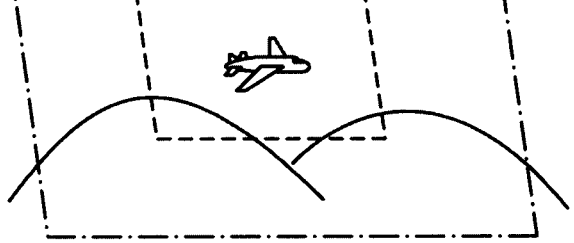
FIGS. 3A to 3C illustrate a diagram showing an operation of an imaging apparatus.
Figure 3:
Figure 3:
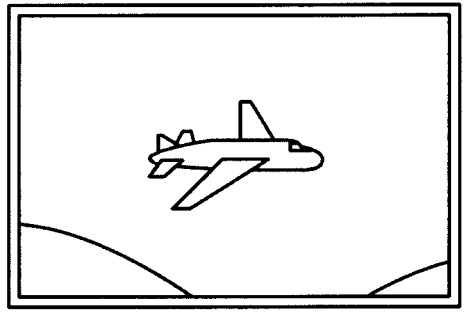
Figure 3:
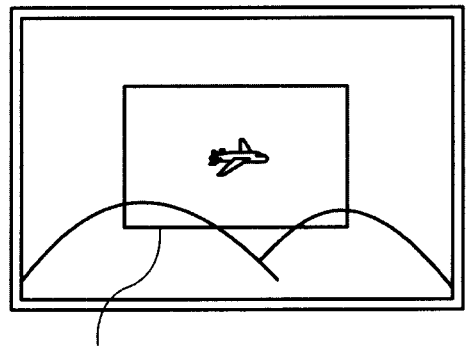

Next, FIGS. 3A to 3C illustrate a diagram showing an operation of an imaging apparatus. In detail, FIGS. 3A to 3C show views obtained by the main optical system and the peripheral optical system, which may be displayed on the LCD monitor 174. FIG. 3A shows a main optical system view 202 obtained by the first optical system 151, and a peripheral optical system view 204 obtained by the second optical system 162. Also, FIG. 3A shows an example display for monitoring a view in which a plane is flying.

FIG. 3B shows that continuous image data outputted by the first optical system 151 is displayed on the LCD monitor 174. Hereinafter, it is called "the first display format" to display continuous image data outputted by the first optical system 151.

FIG. 3C shows that continuous image data outputted by the first optical system 151 and continuous image data outputted by the second optical system 162 are combined in real time, and displayed on the LCD monitor 174. In the imaging apparatus 100, to confirm the border between image data outputted by the first optical system 151 and image data outputted by the second optical system 162, a view frame of the first optical system 151 (hereinafter, main optical system view frame 206) is displayed on the LCD monitor 174. The view frame is optional, and may not be displayed on the LCD monitor 174. Hereinafter, the view shown in FIG. 3C is called "the second display format," which is displaying a real time combination of the continuous image data obtained by the first optical system 151 and continuous image data obtained by the second optical system 162.

The first display format and the second display format can be switched manually or automatically as described above.

FIGS. 4A to 4D show an example of switching between the first display format and the second display format.

Figure 4:
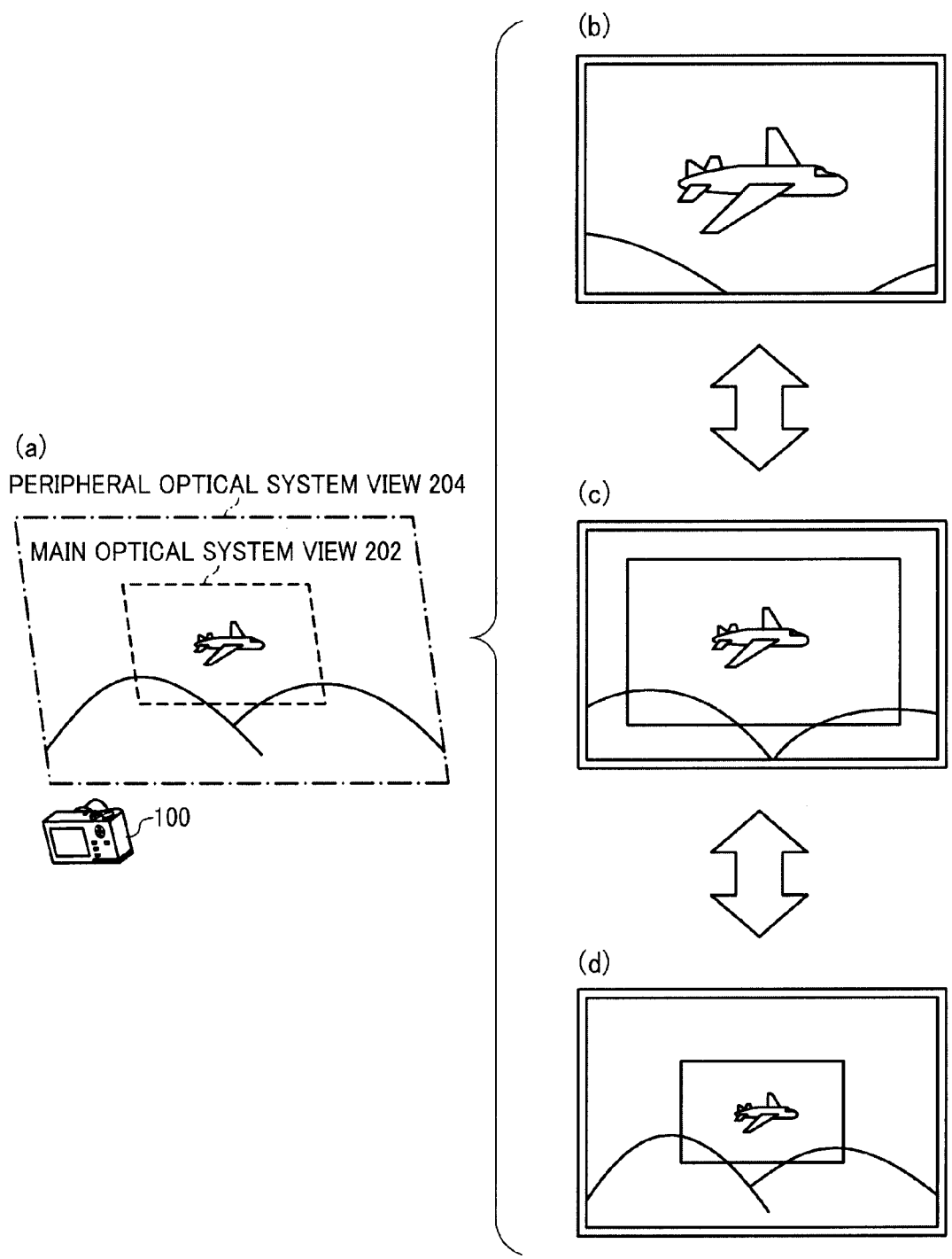
FIGS. 4A to 4D illustrate a diagram showing an operation of an imaging apparatus.

FIG. 4A shows an example of the second display format. FIG. 4B shows an example of the first display format. FIG. 4B shows a view of image data obtained by the first optical system 151. In other words, it is the smallest angle of view. FIG. 4C and FIG. 4D show an example of the second display format. FIG. 4D shows a full view of image data obtained by the second optical system 162. In other words, it is the widest angle of view. FIG. 4C shows a portion of the view of image data obtained by the second optical system 162. In other words, it is a middle view that falls in between what is shown in FIG. 4B and FIG. 4D.

In case of switching from the second display format to the first display format, it may be displayed as a smooth animation which may appear similar to a zooming operation. Furthermore, it may arbitrarily be selected to switch to the middle view shown in FIG. 4C. Moreover in the second display format, a ratio of display area between the image data obtained by the main optical system view 202 and the image data obtained by the peripheral optical system view 204 may be adjusted.

In case of manual switching, for example, a user pushes the display switch 124. Thus, switching of display formats may be performed by toggling the display switch 124. Switching may be implemented with other controls, such as zoom lever 106.

In case of automatic switching, for example, when a subject is only visible in the peripheral optical system view 204, switching may automatically occur when the subject moves into the main optical system view 202. Switching may be configured to occur either when an entirety of the subject moves into the main optical system view 202 or when a first part of the subject moves into the main optical system view 202. Also, automatic switching may occur when a subject which exists in the main optical system view 202 moves to a position where it is only visible in the peripheral optical system view 204.

Figure 5:
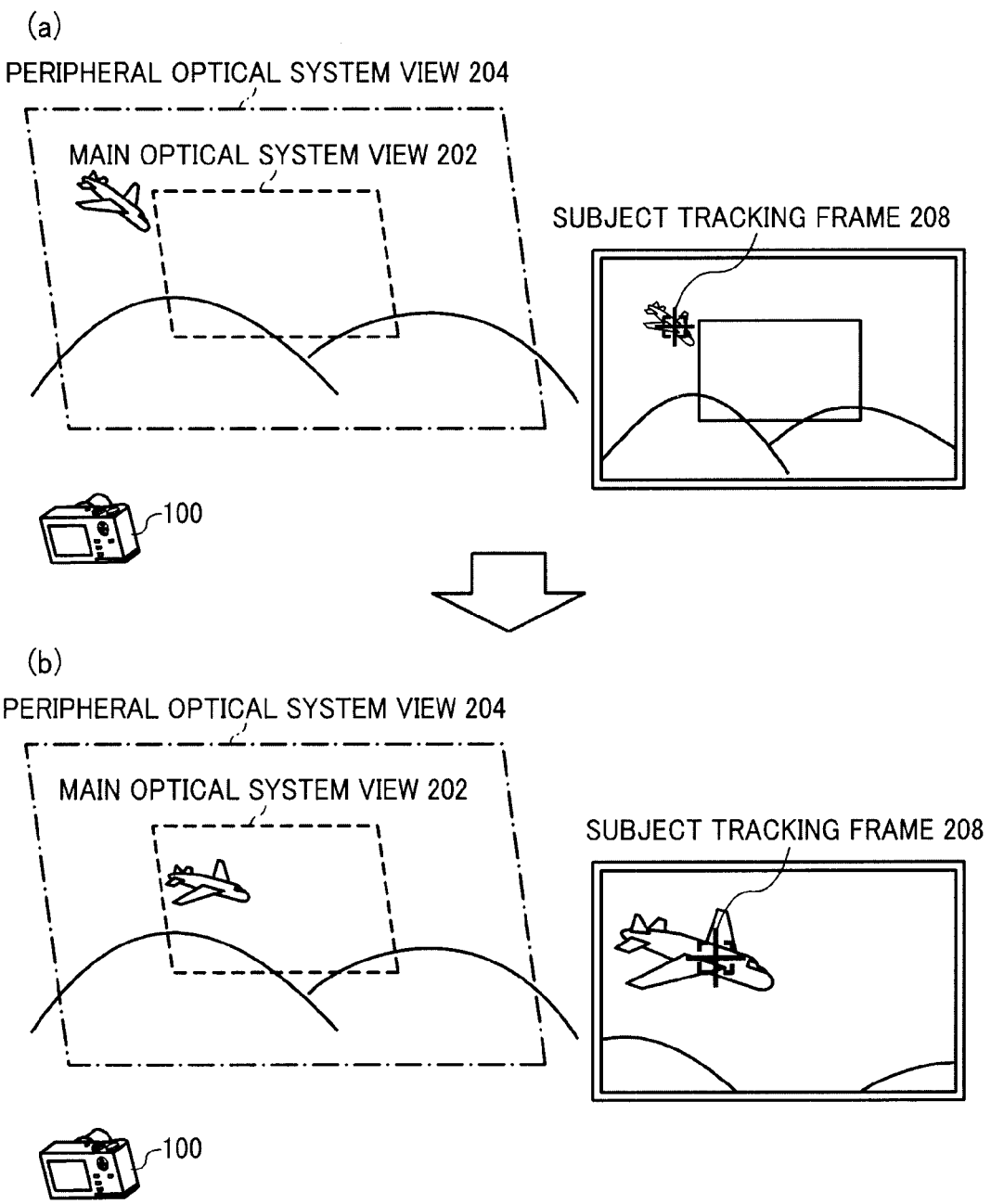
FIG. 5A and FIG. 5B illustrate a diagram showing an operation of an imaging apparatus.

FIG. 5A and FIG. 5B show an example of an automatic switching of display formats.

FIG. 5A shows that a subject which is visible only in the peripheral optical system view 204 moves into the main optical system view 202. The left figure of FIG. 5A shows the aspect of a subject, and the right figure of FIG. 5A shows a display on the LCD monitor 174.

FIG. 5A shows that an intended subject is visible in the peripheral optical system view 204, but it is not visible in the main optical system view 202. As shown in FIG. 5A, a subject tracking frame 208 on the LCD monitor 174 is moved to the intended subject by use of the up/down/left/right/OK switch 128. A user sets the subject tracking frame 208 to the intended subject, and does the half push of the release switch 104 to initiate the tracking of the intended subject.

During tracking of the subject, if the subject moves into the main optical system view 202, when in an automatic switching mode, the imaging apparatus 100 automatically switches a display on the LCD monitor 174 to the display of the main optical system view 202, as shown in FIG. 5B.

Figure 6:
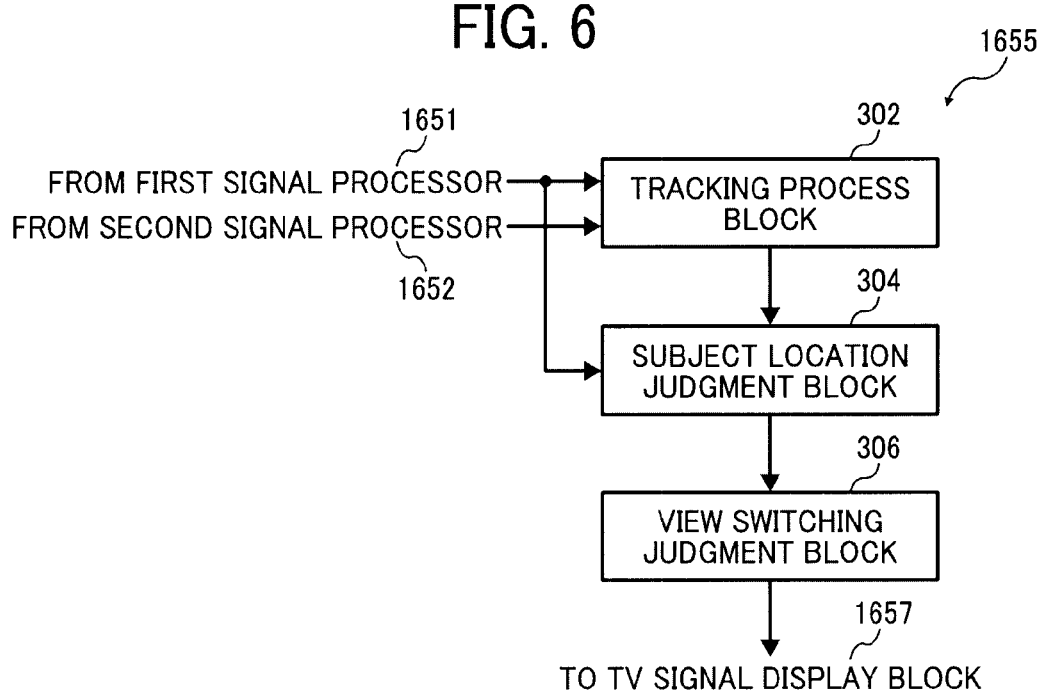
FIG. 6 illustrates a block diagram showing the function of an imaging apparatus.

FIG. 6 illustrates a block diagram showing the function of an imaging apparatus 100. FIG. 6 mainly shows the function of the CPU 1655.

The imaging apparatus 100 has a tracking process block 302, a subject location judgment block 304, a view switching judgment block 306. The tracking process block 302 receives a signal from the first signal processor 1651, which is based on the first image sensor 161. Also, the tracking process block 302 receives a signal from the second signal processor 1652, which is based on the second image sensor 164. The tracking process block 302 detects a subject and tracks the subject based on the output signal from the first signal processor 1651 and the second signal processor 1652. The tracking process block 302 inputs information which shows the location of the subject, to the subject location judgment block 304. For example, the CPU 1655 may take the center position of the LCD monitor 174 as a center position for a coordinate axis system, and control and/or assign coordinates to the subject on the LCD monitor 174.

The subject location judgment block 304 connects to the tracking process block 302. The subject location judgment block 304 receives information that shows the location of the subject from the tracking process block 302. Also, the subject location judgment block 304 receives the signal output by the first signal processor 1651. The subject location judgment block 304 judges whether the location of the subject is within the main optical system view 202 based on the output signal from the first signal processor 1651. The subject location judgment block 304 outputs the judgment result of whether the location of the subject exists within the main optical system view 202, to the view switching judgment block 306.

The view switching judgment block 306 judges whether it switches a view (the first display format or the second display format) based on the judgment result from the subject location judgment block 304. If the judgment result is that the location of the subject exists within the main optical system view 202, the view switching judgment block 306 judges to switch to the first display format. If the judgment result is not that the location of the subject exists within the main optical system view 202, the view switching judgment block 306 judges to switch to the second display format. The view switching judgment block 306 inputs information which shows an appropriate display format, to the TV signal display block 1657. The TV signal display block 1657 switches to the first display format or the second display format based on the output signal from the view switching judgment block 306.

<Operation of the Imaging Apparatus 100>

Figure 7:
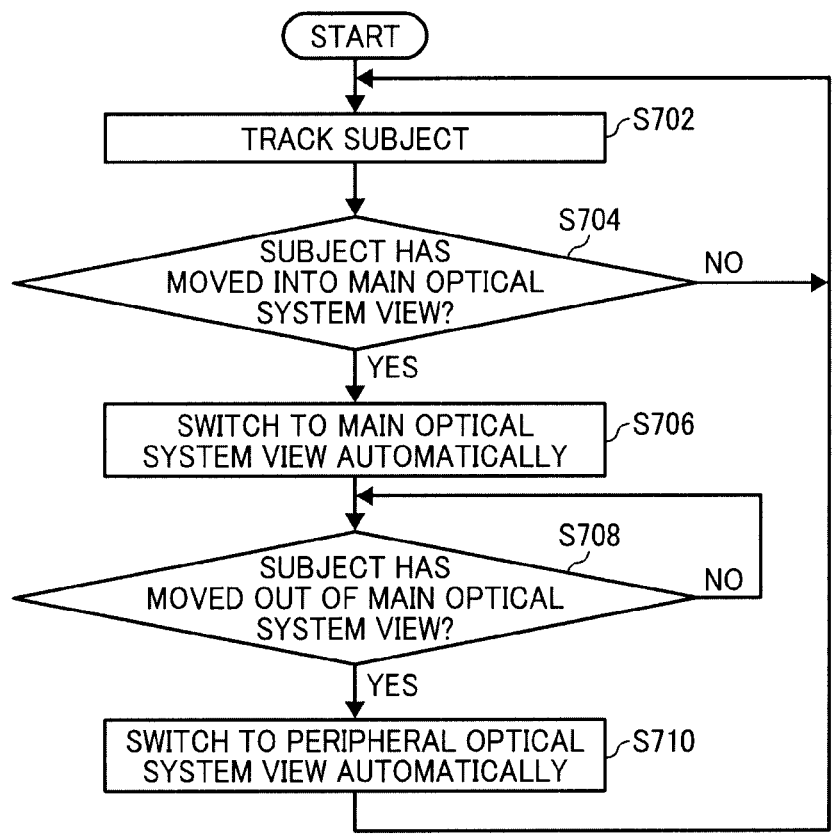
FIG. 7 is a flowchart illustrating an operation of an imaging apparatus.

FIG. 7 is a flowchart illustrating an operation of an imaging apparatus 100. In the flowchart of FIG. 7, the imaging apparatus is initially set with the LCD monitor displaying a view of the second display format.

The imaging apparatus 100 tracks a subject (S702). For example, the tracking process block 302 processes tracking of the subject.

The imaging apparatus 100 judges whether a subject has moved into the main optical system view 202 (S704). For example, the subject location judgment block 304 judges whether a subject has moved into the main optical system view 202, based on information which shows the location of the subject from the tracking process block 302.

If the subject location judgment block 304 judges that a subject has moved into the main optical system view 202 (S704 YES), the imaging apparatus 100 automatically switches to a view of the main optical system view 202 (S706). For example, if the subject location judgment block 304 judges that a subject moved into the main optical system view 202, the view switching judgment block 306 judges to switch to a view of the main optical system view 202, in other words, the first display format.

On the other hand, if the subject location judgment block 304 does not judge that a subject has moved into the main optical system view 202 (S704 NO), the method proceeds back to the step of S702.

The imaging apparatus 100 judges whether a subject has moved out of the main optical system view 202 (S708). For example, the subject location judgment block 304 judges whether a subject has moved out of the main optical system view 202, based on information which shows the location of the subject from the tracking process block 302.

If the subject location judgment block 304 judges that a subject has moved out of the main optical system view 202 (S708 YES), the imaging apparatus 100 automatically switches to a view of the peripheral optical system view 204 (S710). For example, if the subject location judgment block 304 judges that a subject has moved out of the main optical system view 202, the view switching judgment block 306 judges to switch to a view of the peripheral optical system view 204, in other words, the second display format.

After processing of the step of S710, the method proceeds back to the step of S702.

On the other hand, if the subject location judgment block 304 does not judge that a subject has moved out of the main optical system view 202 (S708 NO), the method proceeds back to the step of S708. The subject location judgment block 304 continues the same process until a subject has moved out of the main optical system view 202.

Figure 8:
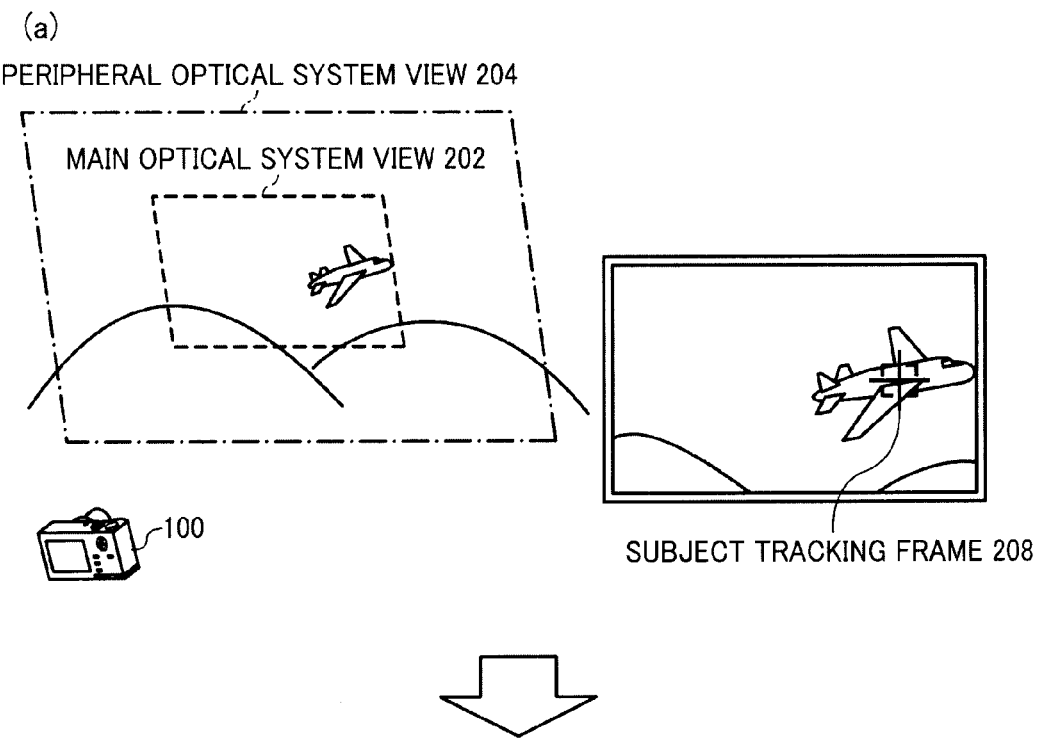
FIG. 8A and FIG. 8B illustrate a diagram showing an operation of an imaging apparatus.
Figure 8:
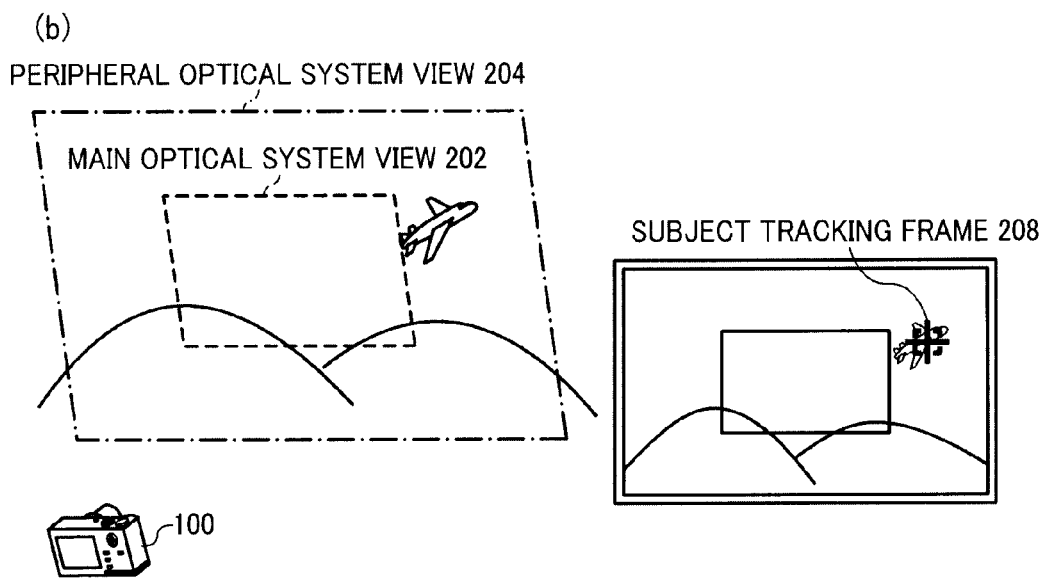

FIG. 8A and FIG. 8B show an example of an automatic switching of display formats.

FIG. 8A shows that a subject which exists within the main optical system view 202 moves to be only visible within the peripheral optical system view 204. The left figure of FIG. 8A shows the aspect of a subject, and the right figure of FIG. 8A shows a display on the LCD monitor 174.

FIG. 8A shows that an intended subject exists within the main optical system view 202. As shown in FIG. 8A, a subject tracking frame 208 on the LCD monitor 174 is moved to the intended subject by use of the up/down/left/right/OK switch 128. A user sets the subject tracking frame 208 to the intended subject, and uses the half push of the release switch 104 to initiate the tracking. When tracking a subject, the imaging apparatus 100 switches to the first display format.

During the tracking of the subject, if the subject has moved out of the main optical system view 202, when in the automatic switching mode, the imaging apparatus 100 automatically switches a display on the LCD monitor 174 to the display of the peripheral optical system view 204, as shown in FIG. 8B. When it is switched from the first display format to the second display format, a subject may momentarily disappear from being viewed on the LCD monitor 174. If the subject is moving very fast, a user may loose track of the subject. However, this momentary disappearance may be avoided as explained below with reference to FIG. 9A and FIG. 9B.

Figure 9:
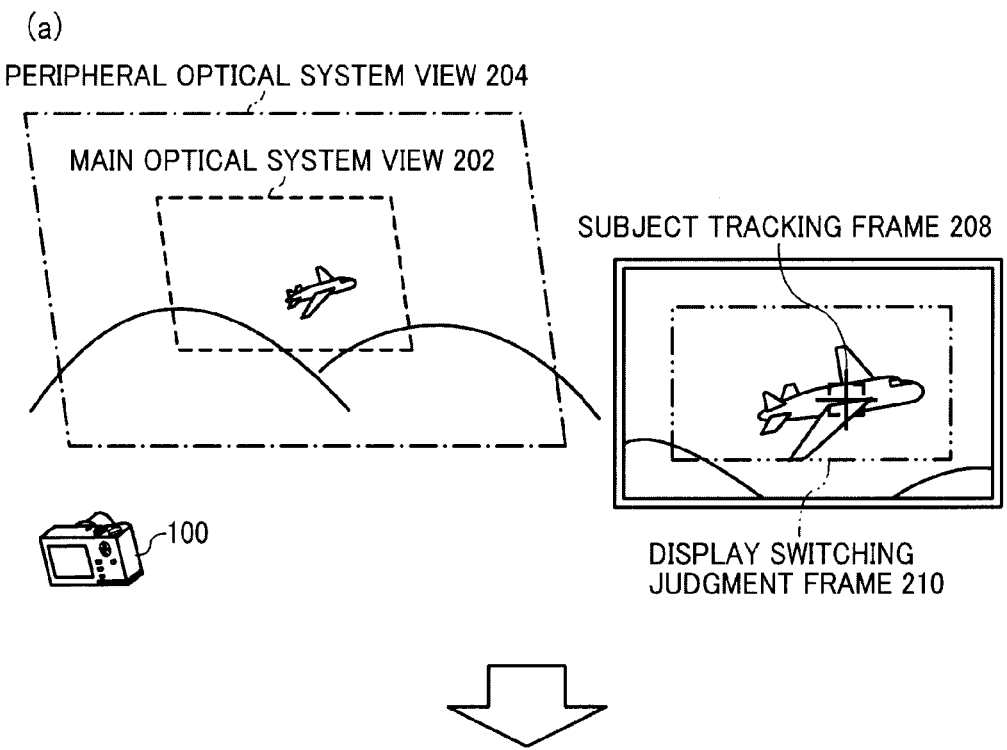
FIG. 9A and FIG. 9B illustrate a diagram showing an operation of an imaging apparatus.
Figure 9:
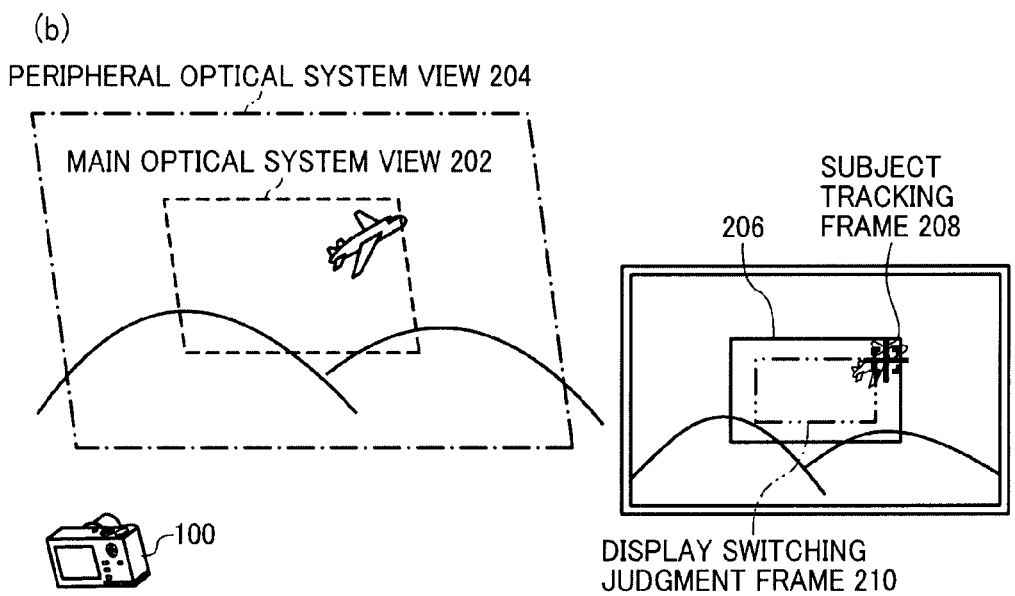

FIG. 9A and FIG. 9B show an example of an automatic switching of display formats.

FIG. 9A shows that a subject which exists within in the main optical system view 202 moves to be only visible within the peripheral optical system view 204. The left figure of FIG.

9A shows the aspect of a subject, and the right figure of FIG. 9A shows a display on the LCD monitor 174.

FIG. 9A shows that an intended subject exists in the main optical system view 202. As shown in FIG. 9A, a subject tracking frame 208 on the LCD monitor 174 is moved to the intended subject by use of the up/down/left/right/OK switch 128. A user sets the subject tracking frame 208 to the intended subject, and does the half push of the release switch 104 to initiate the tracking. When tracking the subject, the imaging apparatus 100 switches to the first display format.

The imaging apparatus 100 judges to switch a view of display by use of a slightly narrower frame (hereinafter, a display switching judgment frame 210) than the main optical system view 202. If the imaging apparatus 100 judges that a subject moved out of the display switching judgment frame 210, the imaging apparatus 100 judges to switch to a view of the second display format. For example, the subject location judgment block 304 judges whether the location of the subject exists within the display switching judgment frame 210 based on the output signal from the first signal processor 1651. The subject location judgment block 304 outputs the judgment result whether the location of the subject exists within the display switching judgment frame 210, to the view switching judgment block 306.

If the judgment result is that the location of the subject exists within the display switching judgment frame 210, the view switching judgment block 306 judges to switch to the first display format. If the judgment result is not that the location of the subject exists within the display switching judgment frame 210, the view switching judgment block 306 judges to switch to the second display format. The view switching judgment block 306 inputs information which shows an appropriate display format, to the TV signal display block 1657. The TV signal display block 1657 switches to the first display format or the second display format based on the output signal from the view switching judgment block 306.

Due to the judgment by use of the display switching judgment frame 210, if the imaging apparatus 100 judges that the tracked subject moves to the fringe of the main optical system view 202, and predicts that the subject will move out of the main optical system view 202, the imaging apparatus 100 judges to switch to the second display format, as shown in FIG. 9B.

When the imaging apparatus 100 switches from the first display format to the second display format, the imaging apparatus 100 can switch the display format without their being a moment where the subject disappears from the LCD monitor 174.

The above process may be described with reference to the flowchart of FIG. 7, wherein some steps are modified. In the step of S704, the imaging apparatus 100 judges whether a subject moved into the display switching judgment frame 210. Also, in the step of S708, the imaging apparatus 100 judges whether a subject moved out of the display switching judgment frame 210.

<Automatic Image Capturing>

FIG. 10A and FIG. 10B, and FIGS. 11A to 11D show examples of an automatic image capturing.

The imaging apparatus 100 automatically captures an image when an intended subject moves to an intended location in the main optical system view 202.

Figure 10:
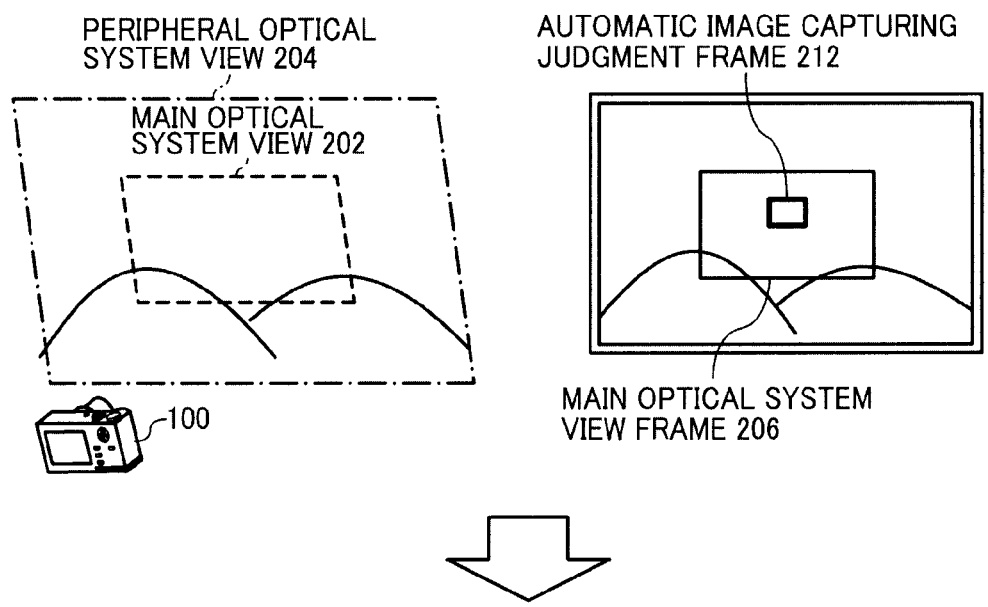
FIG. 10A and FIG. 10B illustrate a diagram showing an operation of an imaging apparatus.
Figure 10:
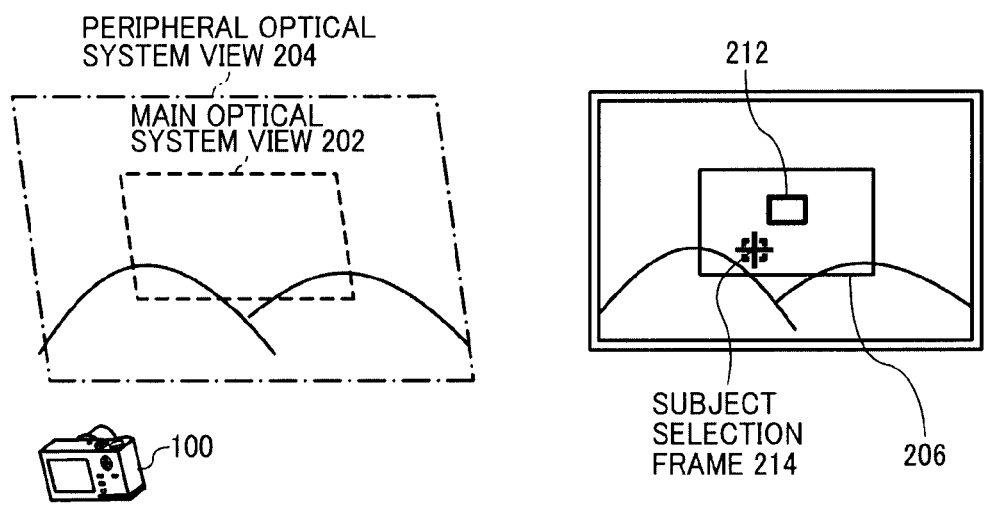

The left figure of FIG. 10A shows a landscape view. The right figure of FIG. 10A shows an area (hereinafter, an automatic image capturing judgment frame 212) where an intended subject will be located when the imaging apparatus 100 automatically captures an image. The automatic image capturing judgment frame 212 is likely to exist in the main optical system view 202.

During setup for automatic image capturing, the peripheral optical system view 204 is displayed on the LCD monitor 174. The automatic image capturing judgment frame 212 may be initially displayed on the peripheral optical system view 204. The automatic image capturing judgment frame 212 can be moved to be within the main optical system view 202 by use of the up/down/left/right/OK switch 128. Furthermore, switch 128 is used to fix or set the location of the automatic image capturing judgment frame 212.

FIG. 10B shows a display example of a display shown on the LCD monitor 174 after fixing the automatic image capturing judgment frame 212.

The automatic image capturing judgment frame 212, and, in addition, a subject selection frame 214 are displayed on the LCD monitor 174. The subject selection frame 214 can be moved by use of the up/down/left/right/OK switch 128.

Figure 11:
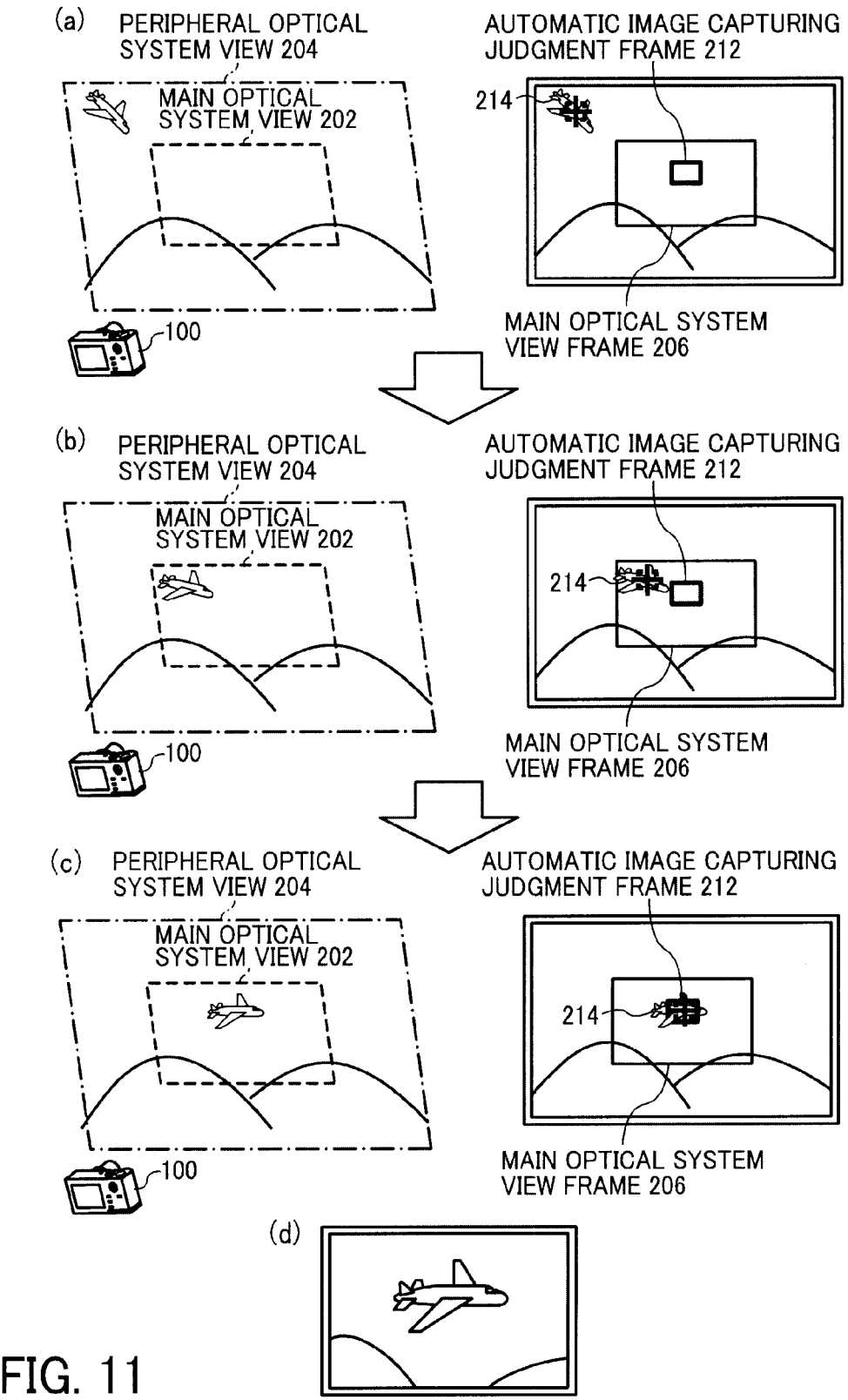
FIG. 11A to 11D illustrate a diagram showing an operation of an imaging apparatus.

FIG. 11A shows that after the intended subject moved into the peripheral optical system view 204, the location of the subject selection frame 214 was set to the intended object. If the location of the subject selection frame 214 is set to the intended object, the user uses switch 128 to start the process of tracking the subject and predicting its motion. The user may be waiting to automatically capture an image of the subject in this situation.

FIG. 11B shows that the intended subject moved into the main optical system view 202. In the state in which the intended subject moved into the main optical system view 202, the intended subject exists within the main optical system view 202, but the imaging apparatus 100 does not automatically capture an image because the intended subject does not exist in the automatic image capturing judgment frame 212.

FIG. 11C shows that the intended subject moved into the automatic image capturing judgment frame 212 and the imaging apparatus 100 automatically captured an image.

In addition, FIG. 11B and FIG. 11C show display examples where the displays on the LCD monitor include the peripheral optical system view 204 (the second display format). However, the display may be switched to the main optical system view 202 (the first display format).

FIG. 11D shows an example of displayed image that was captured automatically.

Figure 12:
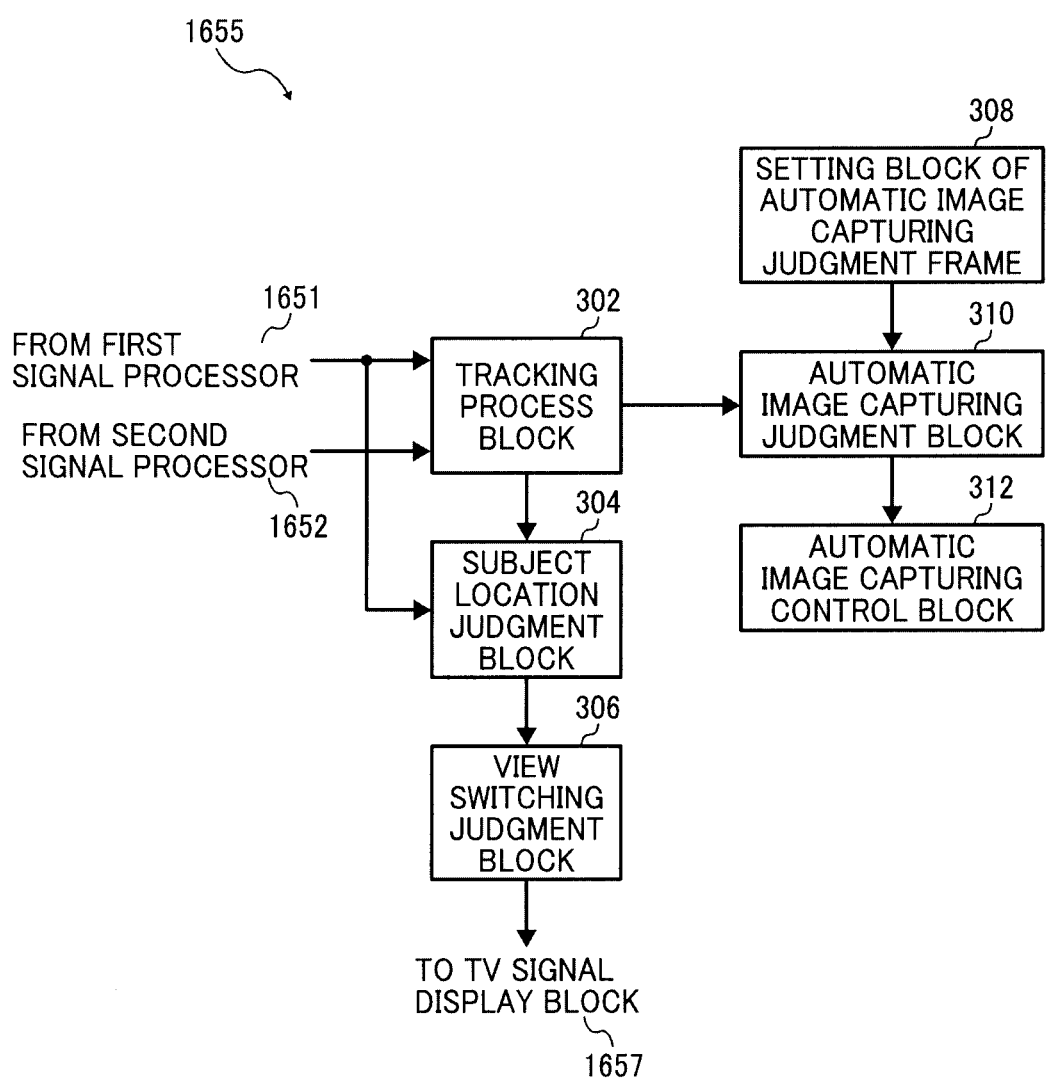
FIG. 12 illustrates a block diagram showing the function of an imaging apparatus.

FIG. 12 illustrates a block diagram showing the function of an imaging apparatus 100. FIG. 12 mainly shows the function of the CPU 1655.

In addition to the description with reference to FIG. 6, the imaging apparatus 100 may have a setting block of automatic image capturing judgment frame 308, an automatic image capturing judgment block 310, an automatic image capturing control block 312. The setting block of automatic image capturing judgment frame 308 sets the automatic image capturing judgment frame 212. For example, a user moves the automatic image capturing judgment frame 212 on the LCD monitor 174. Thereby, when the imaging apparatus 100 automatically captures an image, it can be designated an area which an intended subject should be located. Also, the automatic image capturing judgment frame 212 can be moved to be within the main optical system view 202 by use of the up/down/left/right/OK switch 128. Furthermore, the switch 128 is used to fix the location of the automatic image capturing judgment frame 212. The setting block of automatic image capturing judgment frame 308 inputs information which shows the location of the automatic image capturing judgment frame 212, to the automatic image capturing judgment block 310.

The automatic image capturing judgment block 310 connects to the tracking process block 302 and the setting block of automatic image capturing judgment frame 308. The automatic image capturing judgment block 310 receives information which shows the location of a subject from the tracking process block 302. If the location of the subject selection frame 214 is set to the subject and a user uses switch 128 to fix the location of the automatic image capturing judgment frame 212, the tracking process block 302 starts a subject tracking and a motion prediction. The automatic image capturing judgment block 310 judges whether the location of a subject exists in the automatic image capturing judgment frame 212. If the automatic image capturing judgment block 310 judges that the location of a subject exists in the automatic image capturing judgment frame 212, the automatic image capturing judgment block 310 judges to capture an image automatically. Also, if the automatic image capturing judgment block 310 does not judge that the location of a subject exists in the automatic image capturing judgment frame 212, the automatic image capturing judgment block 310 does not judge to capture an image automatically. If judging to capture an image automatically, the automatic image capturing judgment block 310 outputs information about an automatic image capturing, to the automatic image capturing control block 312.

The automatic image capturing control block 312 connects to the automatic image capturing judgment block 310. If the automatic image capturing control block 312 receives the information about an automatic image capturing from the automatic image capturing judgment block 310, the automatic image capturing control block 312 performs the control for the automatic image capturing. When the imaging apparatus 100 automatically captures an image, it may predict the distance to the subject by use of the first optical system 151 and the second optical system 162. Also, in doing so, the second optical system 162 may judge outside brightness or light source colors.

FIG. 13 is a flowchart illustrating an operation of an imaging apparatus 100.

The imaging apparatus 100 judges whether the subject selection frame 214 is set to a subject and whether "OK" using the switch 128 is selected (S1302). For example, the tracking process block 302 judges whether the subject selection frame 214 is set to a subject and whether "OK" using the switch 128 is selected.

If the tracking process block 302 does not judge that the subject selection frame 214 is set to a subject and "OK" using the switch 128 is selected (S1302 NO), it is back to the step of S1302. The tracking process block 302 continues the same process until the subject selection frame 214 is set to a subject and "OK" using the switch 128 is selected.

If the tracking process block 302 judges that the subject selection frame 214 is set to a subject and "OK" of the switch 128 is selected (S1302 YES), the imaging apparatus 100 starts a subject tracking and a motion prediction (S1304). For example, the tracking process block 302 starts a subject tracking and a motion prediction.

The imaging apparatus 100 judges whether a subject moved into the main optical system view 202 (S1306). For example, the subject location judgment block 304 judges whether a subject moved into the main optical system view 202. If the subject location judgment block 304 does not judge that a subject moved into the main optical system view 202 (S1306 NO), it is back to the step of S1306. The subject location judgment block 304 continues the same process until a subject moves into the main optical system view 202.

If the subject location judgment block 304 judges that a subject moved into the main optical system view 202 (S1306 YES), the imaging apparatus 100, as necessary, switches a view (the first display format or the second display format). Also, the imaging apparatus 100 judges whether a subject moved into the automatic image capturing judgment frame 212 (S1308). For example, the automatic image capturing judgment block 310 judges whether a subject moved into the automatic image capturing judgment frame 212. If the automatic image capturing judgment block 310 does not judge that a subject moved into the automatic image capturing judgment frame 212 (S1308 NO), it is back to the step of S1306. The imaging apparatus 100 continues the process of the steps of S1306 and S1308 until a subject moves into the automatic image capturing judgment frame 212.

If the automatic image capturing judgment block 310 judges that a subject moved into the automatic image capturing judgment frame 212 (S1308 YES), the imaging apparatus 100 executes an automatic image capturing (S1310). For example, the automatic image capturing control block 312 performs the control for the automatic image capturing.

The imaging apparatus may execute a portion or all of the processing steps in response to CPU 1655 executing one or more sequences of one or more instructions contained in a non-transitory computer readable medium (i.e., RAM, ROM, an optical disc, a magnetic disc, etc.) One or more processors in a multi-processing arrangement may also be employed to execute the sequences of instructions.

Although exemplary embodiments have been described above, the present invention is not limited thereto. It should be appreciated that variations may be made in the embodiments described by persons skilled in the art without departing from the scope of the present invention.

What is claimed is:

1. An imaging apparatus, comprising:
a first image capturing unit which obtains an image of a subject and outputs first image data;
a second image capturing unit which obtains another image of the subject and outputs second image data, wherein the second image capturing unit has a wider view than a view of the first image capturing unit; and
a display which displays the first and second image data,
wherein the first image capturing unit automatically captures an image after the subject moved from being only within the view of the second image capturing unit to be within the view of the first image capturing unit,
the image forming apparatus further comprising:
a combine display unit which combines the first image data output by the first image capturing unit and the second image data output the second image capturing unit into combined image data, and displays the combined image data on the display;
a display unit which displays the first image data output by the first image capturing unit on the display; and
a display switching unit which switches the combined image data displayed by the combine display unit and the first image data displayed by the display unit,
wherein when the subject moves out of the view of the first image capturing unit, the display switching unit switches to the combined image data displayed by the combine display unit, and
wherein when the subject moves into the view of the first image capturing unit, the display switching unit switches to the first image data displayed by the display unit.

2. The imaging apparatus according to claim 1,
wherein the first image capturing unit automatically captures the image of the subject in response to the subject moving into an automatic image capturing judgment frame defined within the view of the first image capturing unit.

3. The imaging apparatus according to claim 1,
wherein the second image capturing unit has a deep focus lens with a fixed focus.

4. The imaging apparatus according to claim 1,
wherein the first image capturing unit has a long focus lens or a zoom lens.

5. The imaging apparatus according to claim 1,
wherein a number of pixels of the first image capturing unit is more than a number of pixels of the second image capturing unit.

6. The imaging apparatus according to claim 1,
wherein the display switching unit switches from the combined image data displayed by the combine display unit to the first image data displayed by the display unit using a smooth transition.

7. The imaging apparatus according to claim 1, further comprising:
a display ratio setting unit which adjusts a ratio of an area of the display allocated to the second image data and the first image data.

8. An imaging apparatus, comprising:
a first image capturing unit which obtains an image of a subject and outputs first image data;
a second image capturing unit which obtains another image of the subject and outputs second image data, wherein the second image capturing unit has a wider view than a view of the first image capturing unit; and
a display which displays the first and second image data,
wherein the first image capturing unit automatically captures an image after the subject moved from being only within the view of the second image capturing unit to be within the view of the first image capturing unit,
the image forming apparatus further comprising:
a combine display unit which combines the first image data output by the first image capturing unit and the second image data output the second image capturing unit into combined image data, and displays the combined image data on the display;
a display unit which displays the first image data output by the first image capturing unit on the display; and
a display switching unit which switches the combined image data displayed by the combine display unit and the first image data displayed by the display unit,
wherein when the subject moves out of a display switching judgment frame which is narrower than the view of the first image capturing unit, the display switching unit switches to the combined image data displayed by the combine display unit.

9. The imaging apparatus according to claim 8,
wherein the first image capturing unit automatically captures the image of the subject in response to the subject moving into an automatic image capturing judgment frame defined within the view of the first image capturing unit.

10. The imaging apparatus according to claim 8,
wherein the second image capturing unit has a deep focus lens with a fixed focus.

11. The imaging apparatus according to claim 8,
wherein the first image capturing unit has a long focus lens or a zoom lens.

12. The imaging apparatus according to claim 8,
wherein a number of pixels of the first image capturing unit is more than a number of pixels of the second image capturing unit.

13. The imaging apparatus according to claim 8,
wherein the display switching unit switches from the combined image data displayed by the combine display unit to the first image data displayed by the display unit using a smooth transition.

14. The imaging apparatus according to claim 8, further comprising:
a display ratio setting unit which adjusts a ratio of an area of the display allocated to the second image data and the first image data.

15. A method comprising:
causing a first image capturing unit to obtain an image of a subject and output first image data;
causing a second image capturing unit to obtain another image of the subject and output second image data, wherein the second image capturing unit has a wider view than a view of the first image capturing unit;
automatically capturing, with the first image capturing unit, an image after the subject moved from being only within the view of the second image capturing unit to be within the view of the first image capturing unit;
combining the first image data output by the first image capturing unit and the second image data output the second image capturing unit into combined image data, and displaying the combined image data on a display;
displaying the first image data output by the first image capturing unit on the display; and
switching the combined image data and the first image data displayed on the display,
wherein when the subject moves out of the view of the first image capturing unit, the switching switches to the combined image data, and
wherein when the subject moves into the view of the first image capturing unit, the switching switches to the first image data.

* * * * *